US009323509B2

(12) United States Patent
Roller

(10) Patent No.: US 9,323,509 B2
(45) **Date of Patent: *Apr. 26, 2016**

(54) METHOD AND SYSTEM FOR AUTOMATED PROCESS DISTRIBUTION

(71) Applicant: International Business Machines Corporation, Armonk, NY (US)

(72) Inventor: Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,060

(22) Filed: Nov. 17, 2014

(65) Prior Publication Data

US 2015/0074688 A1 Mar. 12, 2015

Related U.S. Application Data

(63) Continuation of application No. 11/758,707, filed on Jun. 6, 2007, now Pat. No. 8,904,369.

(30) Foreign Application Priority Data

Jun. 8, 2006 (EP) .................................... 06115139

(51) Int. Cl.

*G06F 9/45* (2006.01)
*G06F 9/50* (2006.01)
*G06F 9/48* (2006.01)
*G06F 9/54* (2006.01)
*G06F 9/44* (2006.01)

(52) U.S. Cl.

CPC *G06F 8/457* (2013.01); *G06F 8/40* (2013.01); *G06F 8/445* (2013.01); *G06F 9/4881* (2013.01); *G06F 9/5038* (2013.01); *G06F 9/542* (2013.01); *G06F 8/30* (2013.01); *G06F 2209/5017* (2013.01)

(58) Field of Classification Search

None

See application file for complete search history.

(56) References Cited

PUBLICATIONS

Frederic Montagut, Enabling Pervasive Execution of Workflows, Sep. 2005, IEEE.*
Girish Chafle, Decentralized Orchestration of Composite Web Services, May 2004, ACM.*
Girish Chafle, "Decentralized Orchestration of Composition Web Services", WWW Alt. '04 Proceeding of the 13th International World Wide Web conference on Alternate track papers & posters, May 17-22, 2004, AMC, New York. USA.
Frederic Montagut, "Enabling Pervasive Execution Workflows", Collaborative Computing: Networking, Applications and Worksharing, 2005, 2005 Internatinal Conference.

(Continued)

*Primary Examiner* — Lewis A Bullock, Jr.
*Assistant Examiner* — Mark Gooray
(74) *Attorney, Agent, or Firm* — Jordan IP Law, LLC

(57) ABSTRACT

A method for automated process distribution includes selecting a process definition; identifying a first process portion and at least one second process portion in the process definition; generating a first further process definition for the first process portion; generating a second further process definition for each the second process portion; generating a corresponding service definition for each the second further process definition. In the method, generating the first further process definition includes generating a process definition element configured to invoke at least one service of the service definitions, and generating the second further process definition includes generating a process definition element configured to offer a service of the service definition corresponding to that second further process definition.

15 Claims, 2 Drawing Sheets

(56) References Cited

PUBLICATIONS

Mangala Gowri Nanda, Decentralizing Orchestration of Composition Web Services, Object-Oriented Programming, Systems, Languages & Applications conference 2004, Oct. 24-28, 2004, vol. 39 Issue 10, 2004, Canada.

Non-Final Office Action for U.S. Appl. No. 11/758,707, dated Feb. 2, 2012, 11 pages.

Final Office Action for U.S. Appl. No. 11/758,707, dated Oct. 11, 2012, 10 pages.

Non-Final Office Action for U.S. Appl. No. 11/758,707, dated Aug. 28, 2013, 10 pages.

Final Office Action for U.S. Appl. No. 11/758,707, dated Mar. 25, 2014, 14 pages.

Notice of Allowance for U.S. Appl. No. 11/758,707, dated Jul. 23, 2014, 9 pages.

* cited by examiner

METHOD AND SYSTEM FOR AUTOMATED PROCESS DISTRIBUTION

CROSS-REFERENCE TO RELATED APPLICATIONS

The present application is a continuation of U.S. patent application Ser. No. 11/758,707 filed on Jun. 6, 2007, now U.S. Pat. No. 8,904,369.

FIELD OF THE INVENTION

The invention relates to a method for automated process distribution, and a computing device, data processing program, and computer program product.

BACKGROUND

In order to effectively carry out a computing process on a multiplicity of processors or computers, systems have been developed that provide for the distributed execution of such a computing process. Thus, overall system performance can be scaled up for handling large and resource-intensive processes.

One application of such technology is the distributed execution of programmed business processes via workflow management systems. Such programmed business processes (in this entire document: business processes) are generally carried out on one single workflow management system. However, some workflow management systems are known that provide for distributed execution of a business process, where each of the subcomponents carrying out a certain part of an overall business process has its own computing and storage means.

In order to split an overall process into parts that are distributable to an execution subcomponent, such systems comprise a flow analyzer that generates appropriate process portions and communicates these to various subcomponents for execution.

For doing so, current process distribution systems require all components to be homogenous and operate using a single, generally proprietary, type of process execution platform (workflow management system).

Furthermore, systems are known that optimize the allocation of workload to subcomponents for overall system performance. One example is shown in U.S. Pat. No. 6,507,844 B1, in which it is proposed to analyze network traffic induced by accessing distributed database tables and redistribute these tables to minimize traffic.

Consequently, it is an object of the present invention to provide a method and system for automated process distribution in a platform-independent manner to enable distributed process execution across a combination of various different process execution subcomponents.

SUMMARY

According to one aspect of the invention, a method for automated process distribution includes: selecting a process definition; identifying a first process portion and at least one second process portion in the process definition; generating a first further process definition for the first process portion; generating a second further process definition for each second process portion; generating a corresponding service definition for each second further process definition, wherein generating the first further process definition comprises generating a process definition element configured to invoke at least one service of the service definitions, and wherein generating the second further process definition comprises generating a process definition element configured to offer a service of the service definition corresponding to that second further process definition, and wherein further the first and second further process definitions are distributed for concurrent execution.

By selecting a process definition, a platform-independent description of a process to be distributed and executed is chosen. This process definition, for instance expressed in a process definition computer language, such as BPEL, can be automatically processed and includes instructions (activities) that are further specified in an implementation-independent manner by corresponding service definitions, for instance expressed in a service definition computer language, such as WSDL. In this regard, process definitions enable to orchestrate services within an overall process and service definitions describe the functionality of a service.

By identifying a first process portion and at least one second process portion in the process definition, portions of the process to be distributed are selected. For identifying appropriate portions, a number of selection algorithms can be used, for instance minimizing a function relating to network communication load and communication capacity, or relating to criticality and system availability of subcomponents, or relating to computational load and computation capacity of subcomponents, etc. Process portions can be identified to suit a hierarchical pattern as well as a sequential pattern.

By generating a first further process definition for the first process portion and generating a second further process definition for each second process portion, all portions of the process to be prepared for distributed execution are turned into fully-fledged separate and independent processes that can be distributed individually. By generating a corresponding service definition for each of the second further process definitions, a linking mechanism between the separate processes is provided in a platform-independent manner.

By making a generated fully-fledged (further) business process contain a process definition element (activity, <invoke> in the case of BPEL) configured to invoke a service definition corresponding to another generated business process, a process can have the services relating to one or more of the other processes executed.

Further, by making a generated fully-fledged (further) business process contain a process definition element (activity, <receive> in the case of BPEL) configured to offer a service of the service definition that corresponds to that same business process, such a process makes the functionality encapsulated in that service available to be invoked by another of the fully-fledged (further) business processes.

Since the first and second further process definitions are finally distributed for concurrent execution, the business processes are made available for the systems that actually perform the processes according to the process definitions using accordingly offered services and their invokes.

A computing device for executing the method according to the present invention includes: a process definition analyzer configured to select a process definition and identify a first process portion and at least one second process portion in the process definition; a service definition generator configured to generate service definitions; a process definition generator configured to generate a first further process definition for the first process portion, comprising generating a process definition element configured to invoke at least one service of the service definitions, the process definition generator being further configured to generate a second further process definition (12*b*) for each the second process portion, comprising generating a process definition element configured to offer a service of the service definitions.

By providing a process definition analyzer, a service definition generator, and a process definition generator, appropriate means are provided to carry out the method of present invention. These means may be realized using any combination of properly programmed standard processors, memory, disk and network elements.

In an embodiment of the method, service definitions corresponding to the first and second further process definitions can be distributed for concurrent execution.

In a further embodiment, process definitions are expressed using BPEL. In this case, generating a process definition element configured to invoke a service can comprise generating an <invoke> statement and/or specifying a partnerLink.

Further, in a BPEL-based implementation, generating a process definition element configured to offer a service can comprise generating a <receive> statement, in which the service and/or a partnerLink may be specified.

In an embodiment of the method, at least one of the process portions is identified comprising calculating the computational effort of this process portion and/or comprising calculating the computational effort produced by this process portion and/or comprising calculating the effort of database access produced by this process portion.

A further embodiment of the method comprises generating a corresponding service definition for the first further process definition to enable additional distribution patterns.

DETAILED DESCRIPTION

Figure 1:
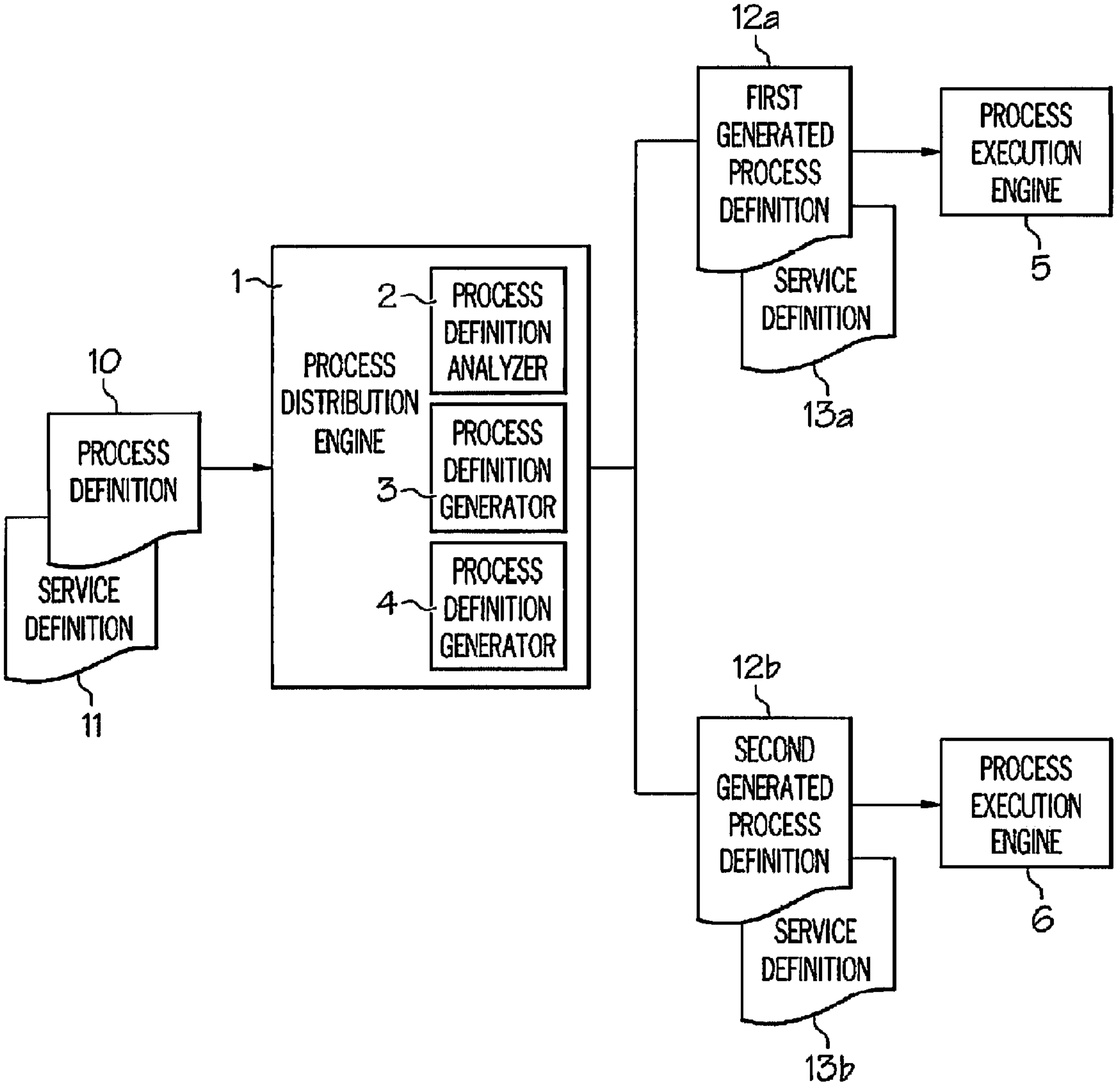
FIG. 1 is a block diagram showing a system overview comprising a possible configuration in use and illustrates the distribution of processes.

FIG. 1 is a block diagram showing a system overview comprising the configuration of a typical embodiment in use. A distributed workflow management system 1, 5, 6 consists of a distributing workflow system 1 and further workflow systems 5 and 6.

Distributing workflow system 1 is a computing system comprising a process definition analyzer 2, service definition generator 3, and process definition generator 4.

Process definition analyzer 2 is configured to select a process definition 10 expressed in the Business Process Execution Language (BPEL), and is further configured to identify separable portions within the BPEL process 10. Analyzer 2 also selects the service definition 11 associated with the process definition 10. Analyzer 2 is configured to apply a number of selection algorithms, for instance minimizing a function relating to network communication load and communication capacity, or relating to criticality and system availability of subcomponents, or relating to computational load and computation capacity of subcomponents, etc. Process portions can be identified to suit sequential patterns of distribution, parallel patterns of distribution, or mixtures thereof, such as hierarchical patterns.

Process definition generator 4 is configured to generate BPEL process definitions 12*a* and 12*b* for the identified portions of BPEL process 10, comprising generating <invoke> and <receive> BPEL activities to provide an interface to services contained in service definitions 13*a*, 13*b* in order to connect the various distributed processes and communicate context data, as will be described in more detail below with respect to FIG. 2.

Service definition generator 3 is configured to generate a service definition 13*a*, and particularly 13*b*, expressed in the Web Services Description Language (WSDL). Service definitions 13*a*, 13*b* correspond to BPEL process definitions 12*a*, 12*b* and each provide the WSDL web services orchestrated by the BPEL process definitions. Further, a first BPEL process can invoke services related to another BPEL process, thus providing a "connection" between the separate generated process definitions.

Process execution components 5 and 6, computer systems as well, provide means to interpret and execute process definitions 12*a*, 12*b* and service definitions 13*a*, 13*b*. Systems 1, 5, and 6 each may be different systems with different BPEL/WSDL implementations by different vendors.

Also, components 1, 5, and 6 may also be implemented as computing components within any computing system with decentralized computing resources.

Figure 2:
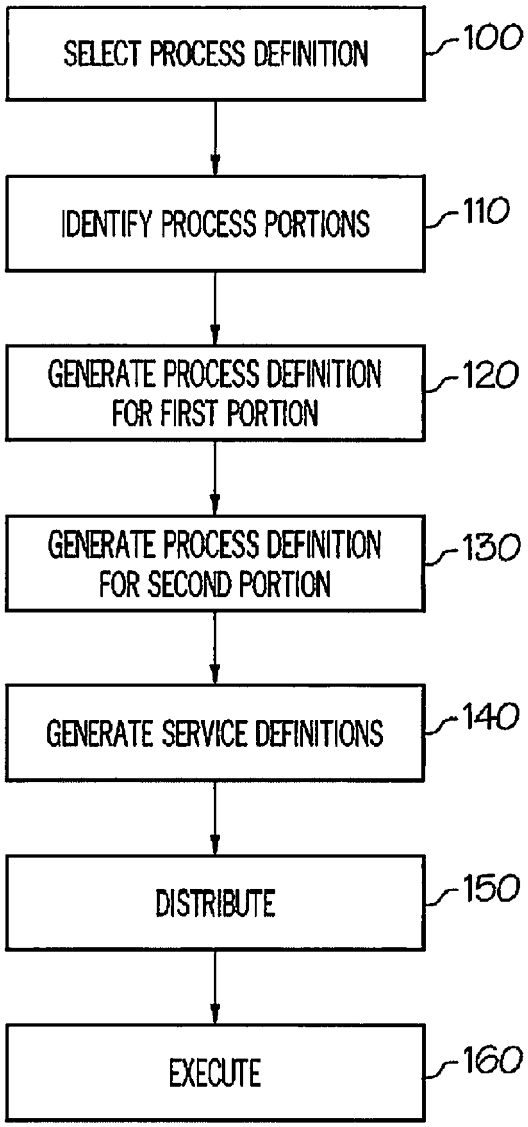
FIG. 2 is a flow diagram giving an overview of an embodiment of the invention.

The mode of operation according to FIG. 2 is described using a brief example given in the following listings. Consider computer 1 selects the following business process 10, defined in BPEL, in step 100:

```
<process name="twoInvokes">
  <variables>
    <variable name="inputMsg" messageType="inputMsg"/>
    <variable name="msgA" messageType="msgA"/>
    <variable name="msgB" messageType="msgB"/>
  </variables>
  <partnerLinks>
    <partnerLink name="client"
          partnerLinkType="clientLT"
          myRole="server
    <partnerLink name="serviceA"
          partnerLinkType="serviceALT"
          partnerRole="server"/>
    <partnerLink name="serviceB"
          partnerLinkType="serviceBLT"
          partnerRole="server"/>
  </partnerLinks>
     <sequence>
          <receive partnerLink="client"
      portType="requestPT"
      operation="request"
      variable="inputMsg"/>
    <assign>
      <copy>
       <from variable="inputMsg.msgA"/>
       <to variable="msgA"/>
      </copy>
      <copy>
       <from variable="inputMsg.msgB"/>
       <to variable="msgB"/>
      </copy>
    </assign>
          <invoke name="A"
      partnerLink="serverA"
      portType="requestPT"
      operation="request"
      variable="msgA"/>
          <invoke name="B"
      partnerLink="serverB"
      portType="requestPT"
      operation="request"
      variable="msgB"/>
     </sequence>
</process>
```

In this case, the process contains two activities, A and B, each further specified in a corresponding web service definition 11.

The WSDL definition for the Web Service invoked in activity A is as follows:

```
<definitions>
  <message name="msgA" messageType="msgA">
  <portType name="requestPT">
    <operation name="request">
      <input message="msgA"/>
    </operation>
  </portType>
  <partnerLinkType name="serviceALT">
    <role name="server">
      <portType="requestPT"/>
    </role>
  </partnerLinkType>
</definitions>
```

A similar definition is available for the service invoked in activity B. The business process itself is represented as a Web Service through the following definition:

```
<definitions>
  <message name="inputMsg"/>
    <part name="msgA" messageType"msgA"/>
    <part name="msgB" messageType="msgB"/>
  </message>
  <portType name="requestPT">
    <operation name="request">
      <input message="inputMsg"/>
    </operation>
  </portType>
  <partnerLinkType name="clientLT">
    <role name="server">
      <portType="requestPT"/>
    </role>
  </partnerLinkType>
</definitions>
```

In step 110, process definition analyzer 2 now identifies both activities as process portions to be distributed and executed separately on computers 5 and 6, respectively.

Now, process definition generator 4 generates a full BPEL process definition 12*a* for the first of the portions, namely activity A, in step 120 as in the listing below. Further, with the help of WSDL service definition 11, the corresponding WSDL service definition 13*a* is generated by service definition generator 3. Depending on the chosen distribution pattern, the service definition 13*a* may or may not be identical to the service definition 11. In the shown example, there would be no need to generate a new service definition, since the interaction with the caller/client remains the same. In an alternative scenario, however, wherein the second process answers the caller/client, service definition 13*a* differs.

```
<process name="twoInvokes">
  <variables>
    <variable name="inputMsg" messageType="inputMsg"/>
    <variable name="msgA" messageType="msgA"/>
    <variable name="msgB" messageType="msgB"/>
  </variables>
  <partnerLinks>
    <partnerLink name="client"
          partnerLinkType="clientLT"
          myRole="server"/>
    <partnerLink name="serviceA"
          partnerLinkType="serviceALT"
          partnerRole="server"/>
    <partnerLink name="twoInvokesPortion2"
          partnerLinkType="twoInvokesPortion2LT"
          partnerRole="server"/>
  </partnerLinks>
     <sequence>
    <receive partnerLink="client"
        portType="requestPT"
        operation="request"
```

-continued

```
        variable="inputMsg"/>
    <assign>
      <copy>
        <from variable="inputMsg"
            Part="msgA"/>
        <to variable="msgA"/>
      </copy>
      <copy>
        <from variable="inputMsg"
            Part="msgB""/>
         <to variable="msgB"/>
       </copy>
    </assign>
    <invoke name="A"
        partnerLink="serverA"
        portType="requestPT"
        request="request"
        variable="msgA"/>
    <invoke name="twoInvokesPortion2"
        partnerLink="twoInvokesPortion2"
        portType="executePT"
        operation="execute"
        variable="msgB"/>
  </sequence>
</process>
```

As can be seen from the listing above, this process definition is generated such that it first invokes the activity (A) as defined by WSDL service definition 13*a* and then invokes the web service as defined in a service definition 13*b* and made available (offered) by a corresponding <receive> statement in process definition 12*b*, which will be described further below. In this way, when executed in step 160, process 12*a* first has service A executed and then has the service relating to process 12*b* invoked.

Respectively, process definition generator 4 generates a full BPEL process definition 12*b* for the second of the portions, namely activity B, in step 130 as in the listing below. Further, the corresponding WSDL service definition 13*b* is generated by service definition generator 3.

```
<process name="twoInvokesPortion2">
  <variables>
    <variable name="msgB" messageType="msgB"/>
  </variables>
  <partnerLinks>
    <partnerLink name="twoInvokesPortion2"
          partnerLinkType="twoInvokesPortion2LT"
          myRole="server"/>
    <partnerLink name="serviceB"
          partnerLinkType="serviceBLT"
          partnerRole="server"/>
  </partnerLinks>
     <sequence>
          <receive name="FromTwoInvokesPortion1"
                  partnerLink="twoInvokesPortion2"
                  portType="twoInvokesPortion2PT"
                  operation="execute"
                  variable="msgB"/>
          <invoke name="B"
       partnerLink="serverB"
       portType="requestPT"
       operation="request"
       variable="msgB"/>
     </sequence>
</process>
```

As can be seen from the listing above, this process definition is generated such that, with the help of the <receive> statement, it makes the web service as defined in service definition 13*b* available for being called, and invokes the activity (B) as defined by WSDL service definition 13*b*.

The appropriate WSDL service definition 13*b*, that enables the "linking" of processes 12*a* and 12*b*, and that is generated by service definition generator 3 for the generated process 12*b*, looks like the following:

```
<definitions>
  <message name="msgB" messageType="msgB"/>
  <portType name="twoInvokesPortion2PT">
    <operation name="execute">
      <input message="msgB"/>
    </operation>
  </portType>
  <partnerLinkType name="twoInvokesPortion2LT">
    <role name="server">
      <portType="executePT"/>
    </role>
  </partnerLinkType>
</definitions>
```

Before execution in step 160, computer 1 communicates BPEL process definitions 12*a*, 12*b* and WSDL service definitions 13*a*, 13*b* to process execution computer systems 5 and 6, respectively.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To avoid unnecessary repetitions, explanations given for one of the various embodiments are intended to refer to the other embodiments as well, where applicable. In and between all embodiments, identical reference signs refer to elements of the same kind. Moreover, reference signs in the claims shall not be construed as limiting the scope. The use of "comprising" in this application does not mean to exclude other elements or steps and the use of "a" or "an" does not exclude a plurality. A single unit or element may fulfill the functions of a plurality of means recited in the claims.

What is claimed is:

1. A computer program product comprising:

a non-transitory computer readable storage medium; and computer usable code stored on the non-transitory computer readable storage medium, where, if executed by a processor, the computer usable code causes a computer to:

identify two or more process statements within an initial process definition to determine separable portions of the initial process definition;

generate a process definition for each of the separable portions, wherein a first process definition is to include a first process statement present in the initial process definition to execute a first activity specified in the initial process definition and a second process statement to execute a partnerLink absent from the initial process definition that is related to a second activity specified in the initial process definition; and generate a service definition for each process definition, wherein the first process statement is to execute the first activity specified in the initial process definition and defined by a service definition generated for the first process definition, and wherein the second process statement is to execute the partnerLink that is related to the second activity specified in the initial process definition and defined by a service definition generated for a second process definition.

2. The computer program product of claim 1, wherein the first process statement is to include an invoke statement specifying a name for the first activity that is to invoke the first activity.

3. The computer program product of claim 1, wherein the second process statement is to include an invoke statement specifying a name for the partnerLink that is to invoke the partnerLink.

4. The computer program product of claim 3, wherein the second process definition is to include a third process statement including a receive statement absent from the initial process definition specifying the name for the partnerLink and a fourth process statement present in the initial process definition including an invoke statement specifying a name for the second activity that is to invoke the second activity.

5. The computer program product of claim 1, wherein the generated process definitions are to include Business Process Execution Language (BPEL) process definitions, and wherein the generated service definitions are to include Web Services Description Language (WSDL) service definitions.

6. A method comprising:

identifying two or more process statements within an initial process definition to determine separable portions of the initial process definition;

generating a process definition for each of the separable portions, wherein a first process definition includes a first process statement present in the initial process definition to execute a first activity specified in the initial process definition and a second process statement to execute a partnerLink absent from the initial process definition that is related to a second activity specified in the initial process definition; and generating a service definition for each process definition, wherein the first process statement executes the first activity specified in the initial process definition and defined by a service definition generated for the first process definition, and wherein the second process statement executes the partnerLink that is related to the second activity specified in the initial process definition and defined by a service definition generated for a second process definition.

7. The method of claim 6, wherein the first process statement includes an invoke statement specifying a name for the first activity.

8. The method of claim 7, further including invoking the first activity.

9. The method of claim 6, wherein the second process statement includes an invoke statement specifying a name for the partnerLink that is to invoke the partnerLink.

10. The method of claim 9, further including invoking the partnerLink.

11. The method of claim 10, wherein the second process definition includes a third process statement including a receive statement absent from the initial process definition specifying the name for the partnerLink and a fourth process statement present in the initial process definition including an invoke statement specifying a name for the second activity that is to invoke the second activity.

12. An apparatus comprising a processor to implement:

a process definition analyzer to identify two or more process statements within an initial process definition to determine separable portions of the initial process definition;

a process definition generator to generate a process definition for each of the separable portions, wherein a first process definition is to include a first process statement present in the initial process definition to execute a first activity specified in the initial process definition and a second process statement to execute a partnerLink absent from the initial process definition that is related to a second activity specified in the initial process definition; and a service definition generator to generate a service definition for each process definition, wherein the first process statement is to execute the first activity specified in the initial process definition and defined by a service definition generated for the first process definition, and wherein the second process statement is to execute the partnerLink that is related to the second activity specified in the initial process definition and defined by a service definition generated for a second process definition.

13. The apparatus of claim 12, wherein the first process statement is to include an invoke statement specifying a name for the first activity that is to invoke the first activity.

14. The apparatus of claim 12, wherein the second process statement is to include an invoke statement specifying a name for the partnerLink that is to invoke the partnerLink.

15. The apparatus of claim 14, wherein the second process definition is to include a third process statement including a receive statement absent from the initial process definition specifying the name for the partnerLink and a fourth process statement present in the initial process definition including an invoke statement specifying a name for the second activity that is to invoke the second activity.

* * * * *